US012098640B2

(12) United States Patent
Hu et al.

(10) Patent No.: US 12,098,640 B2
(45) Date of Patent: Sep. 24, 2024

(54) LIQUID NITROGEN DIRECT INJECTION AND FOAMING INTELLIGENT FILLING SYSTEM BASED ON MINE FIRE AREA CHARACTERISTICS AND APPLICATION METHOD

(71) Applicant: Shandong University of Science and Technology, Qingdao (CN)

(72) Inventors: Xiangming Hu, Qingdao (CN); Di Xue, Qingdao (CN); Yong Zhou, Wuhai (CN); Kuibin Wu, Shanghai (CN); Wei Wang, Shenyang (CN); Lin Zhu, Shanghai (CN); Peng Li, Shenyang (CN); Xiangdong Yao, Shanghai (CN); Weidong Wang, Shenyang (CN); Wenqi Shao, Wuhai (CN); Chuncheng Cai, Shanghai (CN); Fusheng Wang, Tangshan (CN); Liwen Guo, Tangshan (CN)

(73) Assignee: Shandong University of Science and Technology, Qingdao (CN)

(*) Notice: Subject to any disclaimer, the term of this patent is extended or adjusted under 35 U.S.C. 154(b) by 0 days.

(21) Appl. No.: 18/533,005

(22) Filed: Dec. 7, 2023

(65) Prior Publication Data

US 2024/0125234 A1 Apr. 18, 2024

(30) Foreign Application Priority Data

Oct. 18, 2022 (CN) ........................ 202211277798.5

(51) Int. Cl.
*E21F 5/06* (2006.01)
*A62C 5/02* (2006.01)

(52) U.S. Cl.
CPC ................ *E21F 5/06* (2013.01); *A62C 5/024* (2013.01)

(58) Field of Classification Search
CPC ...... E21F 5/06; E21F 5/00; E21F 5/02; A62C 5/024; A62C 3/0221; A62C 3/02; A62C 3/0292
(Continued)

(56) References Cited

U.S. PATENT DOCUMENTS

| | | | | |
|---|---|---|---|---|
| 3,172,477 A * | 3/1965 | Grisdale | .................. | A62C 5/02 261/DIG. 26 |
| 3,272,263 A * | 9/1966 | Jamison | .................... | E21F 5/00 169/46 |

(Continued)

FOREIGN PATENT DOCUMENTS

| | | |
|---|---|---|
| CN | 1411876 A | 4/2003 |
| CN | 1776195 | 5/2006 |

(Continued)

*Primary Examiner* — Christopher R Dandridge
*Assistant Examiner* — Kevin Edward Schwartz

(57) ABSTRACT

The present invention relates to the technical field of mine fire prevention and extinguishing, in particular to a liquid nitrogen direct injection and low-temperature foaming intelligent filling system based on mine fire area characteristics and an application method, comprising a liquid nitrogen storage tank, a liquid nitrogen direct injection system and a low-temperature foaming system, wherein the liquid nitrogen storage tank communicates with a liquid nitrogen pressurizing device through a main pipeline; a temperature control unit is arranged on the main pipeline; and the liquid nitrogen pressurizing device is connected with the liquid nitrogen direct injection system and the low-temperature foaming system, respectively, liquid nitrogen is directly injected into a foam liquid, to prepare a low-temperature foam type fire preventing and extinguishing material by means of forced convection, membrane boiling, explosion boiling and nucleate boiling between the liquid nitrogen and water.

2 Claims, 5 Drawing Sheets

(58) Field of Classification Search
USPC .......................................................... 169/63
See application file for complete search history.

(56) References Cited

U.S. PATENT DOCUMENTS

| | | | | |
|---|---|---|---|---|
| 5,255,747 | A * | 10/1993 | Teske | B05B 7/32 261/DIG. 26 |
| 5,632,338 | A * | 5/1997 | Hunter | A62C 35/023 169/9 |
| 7,104,336 | B2 * | 9/2006 | Ozment | A62C 5/02 169/44 |
| 9,144,700 | B2 * | 9/2015 | Burkhart | A62C 35/64 |
| 9,526,933 | B2 * | 12/2016 | Kochelek | A62C 35/60 |
| 11,559,711 | B2 * | 1/2023 | Mu | B01F 25/3131 |
| 2005/0224239 | A1 | 10/2005 | Ozment | |
| 2019/0060689 | A1 * | 2/2019 | Kochelek | A62C 35/645 |

FOREIGN PATENT DOCUMENTS

| | | | | | |
|---|---|---|---|---|---|
| CN | 100429380 | C | | 10/2008 | |
| CN | 202937294 | U | | 5/2013 | |
| CN | 103586981 | A | | 2/2014 | |
| CN | 203499717 | U | * | 3/2014 | |
| CN | 107961465 | A | | 4/2018 | |
| CN | 108525166 | A | | 9/2018 | |
| CN | 110913958 | A | | 3/2020 | |
| CN | 111810218 | A | | 10/2020 | |
| CN | 111803826 | B | * | 9/2021 | A62C 27/00 |
| WO | 2015055027 | A1 | | 4/2015 | |

* cited by examiner

LIQUID NITROGEN DIRECT INJECTION AND FOAMING INTELLIGENT FILLING SYSTEM BASED ON MINE FIRE AREA CHARACTERISTICS AND APPLICATION METHOD

CROSS-REFERENCE TO RELATED APPLICATIONS

The present application claims the priority of Chinese patent application entitled "Liquid Nitrogen Direct Injection and Low-temperature Foaming Intelligent Filling System Based on Mine Fire Area Characteristics and Application Method" submitted on Oct. 18, 2022, with the application number of 202211277798.5, the entire contents of which are incorporated herein by reference.

TECHNICAL FIELD

The present invention relates to the technical field of mine fire prevention and extinguishing, and in particular to a liquid nitrogen direct injection and low-temperature foaming intelligent filling system based on mine fire area characteristics and an application method.

BACKGROUND

Spontaneous combustion of coal can cause economic losses, environmental pollution and casualties, which seriously threaten the normal production of coal mines. At present, inert gas and foam type fire-fighting materials are widely used in the prevention and control of spontaneous combustion of coal. However, inert gases mainly composed of nitrogen ($N_2$) and carbon dioxide ($CO_2$) have problems such as low specific heat, low concentration and long fire extinguishing period. The cooling effect of traditional foam fire-fighting materials represented by three-phase foam, inhibited foam and solidified foam needs to be improved. For example, CN200510095213.8 discloses a three-phase foam preparation system for preventing spontaneous combustion of coal, comprising a stirrer, a foam generator, and a filter, wherein an air inlet is arranged on the pipe wall of the foam generator; the air inlet is connected with a nitrogen injection machine or a mine air compressor through an air inlet pipe; a bypass pipe is arranged on the grouting pipe connected to the inlet of the filter; and the tail of the bypass pipe is connected with a through tube at the outlet of the foam generator. After slurry prepared in the grouting pipe passes through the filter with a filter screen, compressed air or nitrogen is injected into the foam generator by an air compressor or nitrogen injector, so that the slurry is foamed to form a gas-liquid-solid three-phase foam with air or nitrogen as the gas phase. However, the three-phase foam has a small cooling capacity and mainly relies on water evaporation to remove heat.

At present, inert gas and foam fire-fighting materials are poor in pertinence, and the application effect needs to be improved. In addition, there are few underground perfusion systems that can simultaneously inject inert gas and foam-based fire-extinguishing materials, and existing perfusion systems have low automation and high labor costs. In view of this, on the basis of studying the mine fire area characteristics and the inherent requirements of fire prevention and extinguishing materials, how to improve the cooling performance of fire prevention and extinguishing materials, improve the automation degree of the injection system and improve the efficiency of fire prevention and extinguishing, has become the main technical problem to be urgently solved by those skilled in the art.

SUMMARY

For the problems above, the present invention discloses a liquid nitrogen direct injection and low-temperature foaming filling system for mine fire areas and an application method. By means of characteristics of a large cooling capacity and good stability of liquid nitrogen, the liquid nitrogen is directly injected into a Characteristic fire zone, achieving the effects of "high pressure oxygen exhaust" and "cooling and refrigeration"; and the liquid nitrogen is directly injected into a foam liquid, to prepare a low-temperature foam fire preventing and extinguishing material by means of forced convection, membrane boiling, explosion boiling and nucleate boiling between the liquid nitrogen and water, thereby solving the problems of filling different fire preventing and extinguishing materials according to Characteristic fire zones and regulating the density of fire preventing and extinguishing materials.

The present invention provides the following technical scheme: a liquid nitrogen direct injection and low-temperature foaming intelligent filling system based on mine fire area characteristics, including a liquid nitrogen storage tank, a liquid nitrogen direct injection system and a low-temperature foaming system, wherein liquid nitrogen prepared by the liquid nitrogen direct injection system is directly injected into a Characteristic fire zone; and the low-temperature foaming system is capable of filling liquid nitrogen foams, inorganic solidified foams, three-phase foams and inhibited foams into the Characteristic fire zone.

The liquid nitrogen storage tank communicates with a liquid nitrogen pressurizing device through a main pipeline; a temperature control unit is arranged on the main pipeline; the liquid nitrogen pressurizing device is connected with the liquid nitrogen direct injection system and the low-temperature foaming system, respectively; and the liquid nitrogen direct injection system includes a first branch pipeline as well as a first branch valve and a liquid nitrogen density monitoring system arranged on the first branch pipeline. Pressurizing, pressure stabilization, flow control and density, temperature and pressure monitoring on the liquid nitrogen in the main pipeline and the first branch pipeline are performed through the liquid nitrogen pressurizing device, the liquid nitrogen density monitoring system, meters and valves.

The low-temperature foaming system includes a second branch pipeline; the second branch pipeline communicates with the liquid nitrogen inlet of a foam generator; the foam liquid inlet of the foam generator communicates with a foam liquid plunger pump through a fifth branch pipeline; the foam liquid plunger pump communicates with a clean water tank through a fourth branch pipeline; a foam liquid tank is arranged on the fourth branch pipeline; the foam outlet of the foam generator communicates with a sixth branch pipeline; a foam density monitoring system is arranged on the sixth branch pipeline; a third branch pipeline communicates with a fifth branch pipeline; the third branch pipeline also communicates with a high-pressure slurry or inhibitor solution pipeline; and the liquid nitrogen pressurizing device communicates with the first branch pipeline and the second branch pipeline, respectively.

A first flow control valve is arranged on the first branch pipeline; a second flow control valve is arranged on the second branch pipeline; and a third flow control valve is arranged on the fifth branch pipeline.

The liquid nitrogen density monitoring system and the foam density monitoring system are respectively connected with a controller; and the controller is connected with the first flow control valve, the second flow control valve and the third flow control valve, respectively.

A first branch valve, a first thermometer, a first pressure gauge, the first flow control valve, a first metal hose, a first one-way valve, a first pressure stabilizing valve, a block valve and a release valve are sequentially arranged on the first branch pipeline from the side close to the liquid nitrogen pressurizing device to the side of the liquid nitrogen density monitoring system.

A second branch valve, a second thermometer, a second pressure gauge, a second flow control valve, a second metal hose, a second pressure stabilizing valve and a second one-way valve are sequentially arranged on the second branch pipeline from the side of the liquid nitrogen pressurizing device to the side of the foam generator.

The third branch valve and a third one-way valve are arranged on the third branch pipeline; a fourth branch valve is arranged between a clean water tank and a foam liquid tank; the third flow control valve, a fourth one-way valve and a fifth one-way valve are sequentially arranged on the fifth branch pipeline from the foam liquid plunger pump to the foam generator; the third branch pipeline communicates with the fifth branch pipeline between the fourth one-way valve and the fifth one-way valve; and a sixth one-way valve is arranged between the foam density monitoring system and the foam generator.

The foam generator includes a housing and a hollow spiral tube arranged in the housing; a foam liquid outlet, helical blades and stirring blades are arranged on the hollow spiral tube; the liquid nitrogen inlet and the foam outlet of the foam generator are respectively arranged on both sides of the housing; the opening of the hollow spiral tube is the foam liquid inlet; the foam liquid inlet and the liquid nitrogen inlet are formed in a same side of the housing; and the stirring blades are arranged at one end close to the foam outlet.

The helical blades have the pitch of 90-130 mm and the number of turns of 4-5, and is in a clockwise rotation direction; the inner diameter of the hollow spiral tube is 30-40 mm, and the outer diameter is 34-48 mm; the foam liquid outlet is of a round hole with the diameter of 6-15 mm; and the working pressure of the foam liquid plunger pump is 29-36 MPa. The release valve, when the pressure in a pipeline is higher than 2.3-4.0 MPa, releases a gas or liquid therein; and the pressure stabilizing valve allows a gas or liquid at the pressure higher than 1.5-2 MPa in the pipeline to pass through. The working pressure of the foam liquid plunger pump is 29-36 MPa. The metal hose is a high-pressure-resistant thermal-insulating metallic soft connection pipe, is of a double-layer lining structure, and is filled with a thermal-insulating material between layers.

After pressurization and temperature control of the liquid nitrogen under the action of the pressurizing device, if the density of the liquid nitrogen conforms to a set threshold, the liquid nitrogen is directly injected into the Characteristic fire zone through the first branch pipeline; if the density of the liquid nitrogen does not conform to the set threshold, the liquid nitrogen is injected into the Characteristic fire zone after the flow of the liquid nitrogen is automatically regulated through the liquid nitrogen density monitoring system; the liquid nitrogen after pressurization and temperature control passes through the second branch pipeline; furthermore, with the combination of the fourth, fifth and sixth branch pipelines, if the density of liquid nitrogen foams conforms to the set threshold, the liquid nitrogen foams are filled into the Characteristic fire zone through the foam generator; if the density of the liquid nitrogen foams does not conform to the set threshold, the liquid nitrogen foams are injected into the Characteristic fire zone after the flow control valve is controlled by the controller to regulate the flow of the foam liquid/liquid nitrogen; the liquid nitrogen after pressurization and temperature control passes through the second branch pipeline; furthermore, with the combination of the third, fourth, fifth and sixth branch pipelines, if the foam density conforms to the set threshold, the three-phase foams, the inorganic solidified foams and the inhibited foams are filled into the Characteristic fire zone through the foam generator; and if the foam density does not conform to the set threshold, the foams are filled into the Characteristic fire zone after a corresponding flow control valve is controlled by the controller to regulate the flow of the foam liquid/liquid nitrogen.

The Characteristic fire zones include far-distance large-space fire areas and near-distance small-space fire areas; the far-distance large-space fire areas are mainly goafs; and the near-distance small-space fire areas mainly include coal pillars, airtight walls, top-coal caving regions, intake airways, return airways, open-off cut and stopping lines. The liquid nitrogen storage tank is filled with liquid nitrogen through a liquid nitrogen tank truck on a well, and the storage tank filled with the liquid nitrogen is transferred under the well. Since the liquid nitrogen storage tank is filled with liquid nitrogen through the liquid nitrogen tank truck on the well, the problems of pressure loss, pipe blocking because of icing, and the like, caused in long-distance transportation of a ground direct injection type liquid nitrogen fire prevention and extinguishing system, can be avoided. Particularly, when the liquid nitrogen is filled into the Characteristic fire zone, the density of the liquid nitrogen can be automatically regulated according to demands of fire prevention and extinguishing of a site. The liquid nitrogen direct injection system and the low-temperature foaming system are included. Relevant valves are adjusted, the liquid nitrogen of good stability and large cooling capacity is filled into the Characteristic fire zone through the liquid nitrogen direct injection system according to demands of the fire prevention and extinguishing scene, and foam type fire prevention and extinguishing materials of three-phase foams, inhibited foams and the like with a large cooling capacity and a good inerting effect can also be filled into the Characteristic fire zone through the low-temperature foaming system. Therefore, the grouting system of the present invention fills not only a single fire prevention and extinguishing material, but also multiple fire prevention and extinguishing materials into the Characteristic fire zone.

The application method of the system includes the following steps:

a. sequentially connecting the liquid nitrogen direct injection system and the low-temperature foaming system, and inspecting the air tightness;
b. filling the liquid nitrogen into a far-distance large-space fire area through the liquid nitrogen direct injection system:

namely opening the first branch valve, closing the second branch valve, opening a liquid inlet/outlet master valve connected with the liquid nitrogen storage tank, adjusting the liquid nitrogen pressurizing device, the temperature control unit, the flow control valve and the pressure stabilizing valve, observing thermometer and the pressure gauge, maintaining the temperature and pressure, and if the density of the liquid nitrogen conforms to the set threshold, directly injecting the liquid nitrogen into a mine fire area; if the density of the liquid nitrogen does not conform to the set threshold, injecting into the Characteristic fire zone after regulating the flow of the liquid nitrogen through the flow control valve;

c. filling the foam type fire prevention and extinguishing material into the mine fire area through the low-temperature foaming system:

namely closing the first branch valve, opening the liquid inlet/outlet master valve connected with the liquid nitrogen storage tank, the second branch valve and the fourth branch valve, adjusting the liquid nitrogen pressurizing device, the flow control valve, the pressure stabilizing valve and the temperature control unit, observing thermometer and the pressure gauge, maintaining the temperature and pressure of the liquid nitrogen, and if the density of the liquid nitrogen foams conforms to the set threshold, directly injecting the liquid nitrogen foams into the mine fire area through the foam generator; if the density of the liquid nitrogen foams does not conform to the set threshold, injecting into the Characteristic fire zone after regulating the flow control valve to regulate the flow of the liquid nitrogen or foams;

the first branch valve, opening the liquid inlet/outlet master valve connected with the liquid nitrogen storage tank, the second branch valve, the third branch valve and the fourth branch valve, adjusting the liquid nitrogen pressurizing device, the flow control valve, the pressure stabilizing valve and the temperature control unit, observing thermometer and the pressure gauge, maintaining the temperature and pressure of the liquid nitrogen, and if the foam density conforms to the set threshold, directly injecting three-phase foams, inorganic solidified foams and inhibited foams into the mine fire area through the foam generator; if the foam density does not conform to the set threshold, injecting into the Characteristic fire zone after regulating the foam liquid, the flow of the liquid nitrogen, a high-pressure slurry or a inhibitor solution.

The scheme, compared with the prior art, has the beneficial effects that: (1) different low-temperature foam type fire preventing and extinguishing materials are prepared by means of forced convection, membrane boiling, explosion boiling and nucleate boiling between the liquid nitrogen and water; (2) appropriate fire prevention and extinguishing materials are selected according to mine fire area characteristics. The filling system of the present invention can be matched with multiple fire prevention and extinguishing materials on the basis of studying the mine fire area characteristics and the inherent requirements of fire prevention and extinguishing materials. When filling the foam type fire prevention and extinguishing materials such as the inorganic solidified foams, the inhibited foams and the three-phase foams, the low-temperature foaming system acts up; and when filling the liquid nitrogen, the liquid nitrogen direct injection system acts up; and (3) according to actual application of the site, the density of different fire prevention and extinguishing materials is regulated. By adopting the filling system, the technical problem that a conventional foam type fire prevention and extinguishing material is poor in cooling effect, and defects caused by large blindness, poor application effect, high cost and the like of the conventional fire prevention and extinguishing material are avoided. Specifically, in the present invention, to prevent and control a far-distance large-space fire area, the liquid nitrogen is directly injected into the Characteristic fire zone, or low-temperature three-phase foams, liquid nitrogen foams and inhibited foams are prepared by means of forced convection, membrane boiling, explosion boiling and nucleate boiling between the liquid nitrogen and water; and to prevent and control a near-distance small-space fire area, low-temperature inorganic solidified foams are prepared by means of forced convection, membrane boiling, explosion boiling and nucleate boiling between the liquid nitrogen and water. In addition, the density of the fire prevention and extinguishing material can be regulated according to actual demands of the site, thereby greatly improving the fire prevention and extinguishing efficiency; and (4) The liquid nitrogen direct injection low-temperature foaming filling system and the application method used for the mine fire area of the present invention are based on the liquid nitrogen storage tank and sufficiently utilize the advantages of large liquid nitrogen cooling capacity and good stability, the liquid nitrogen storage tank can be repeatedly filled on the ground, and a sufficient flow can be ensured by alternative circulating use of liquid nitrogen storage tanks.

In the figures: 1-1 is a liquid nitrogen storage tank, 1-2 is a main pipeline, 2-1 is a first thermometer, 2-2 is a second thermometer, 3 is a clean water tank, 4 is a foam generator, 4-1-1 is a liquid nitrogen inlet, 4-1-2 is a foam liquid inlet, 4-1-3 is a foam outlet, 4-2-1 is a hollow spiral tube, 4-2-2 is a helical blade, 4-2-3 is a foam liquid outlet, 5 is a first branch pipeline, 6 is a second branch pipeline, 7 is a third branch pipeline, 8 is a fourth branch pipeline, 9 is a fifth branch pipeline, 10 is a sixth branch pipeline, 11 is a liquid inlet/outlet master valve, 11-1 is a first branch valve, 11-2 is a second branch valve, 11-3 is a third branch valve, 11-4 is a fourth branch valve, 12-1 is a first pressure gauge, 12-2 is a second pressure gauge, 13 is a liquid nitrogen pressurizing device, 14-1 is a first flow control valve, 14-2 is a second flow control valve, 14-3 is a third flow control valve, 15-1 is a first metal hose, 15-2 is a second metal hose, 16-1 is a first one-way valve, 16-2 is a second one-way valve, 16-3 is a third one-way valve, 16-4 is a fourth one-way valve, 16-5 is a fifth one-way valve, 16-6 is a sixth one-way valve, 17-1 is a first pressure stabilizing valve, 17-2 is a second pressure stabilizing valve, 18 is a block valve, 19 is a release valve, 20-1 is a liquid nitrogen density monitoring system, 20-2 is a foam density monitoring system, 21 is a foam liquid plunger pump, 22 is a foam liquid tank, and 23 is a temperature control unit.

DETAILED DESCRIPTION OF THE EMBODIMENTS

The technical schemes in the embodiments of the present invention will be described clearly and completely below. Obviously, the described embodiment is only an embodiment of the present invention, rather than all the embodiments. Based on the embodiments of the present invention, all other embodiments obtained by those of ordinary skill in the art without creative efforts shall fall within the protection scope of the present invention.

It should be noted that terms used herein are only for the purpose of describing specific implementations and are not intended to limit the exemplary implementations of the present application. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

Figure 1:
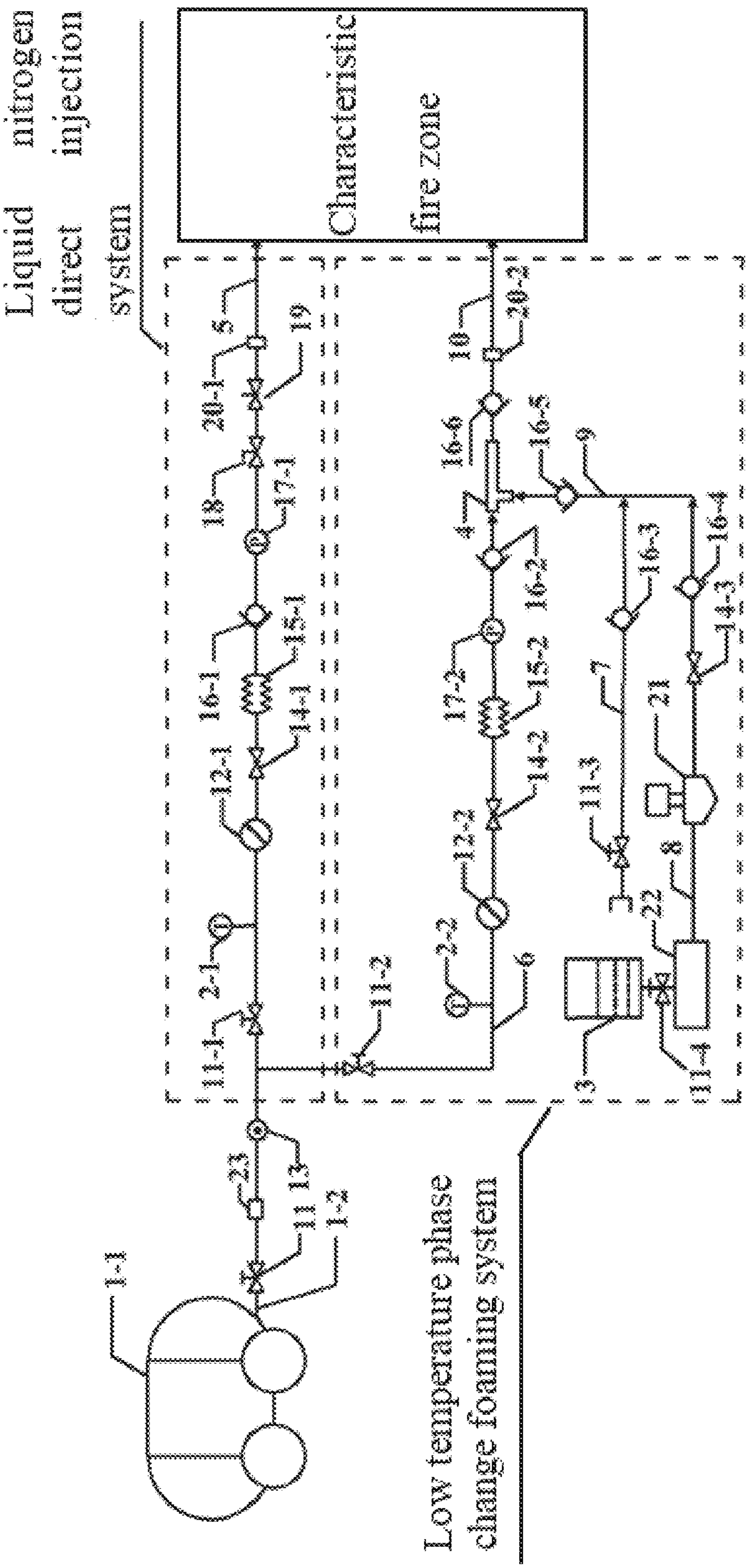
FIG. 1 is a structural schematic diagram of an embodiment of the present invention.

As shown in FIG. 1, the liquid nitrogen direct injection and low-temperature foaming intelligent filling system based on mine fire area characteristics, of the present invention, including liquid nitrogen storage tank 1-1, main pipeline 1-2, first thermometer 2-1, second thermometer 2-2, clean water tank 3, foam generator 4, liquid nitrogen inlet 4-1-1, foam liquid inlet 4-1-2, foam outlet 4-1-3, hollow spiral tube 4-2-1, helical blade 4-2-2, foam liquid outlet 4-2-3, first branch pipeline 5, second branch pipeline 6, third branch pipeline 7, fourth branch pipeline 8, fifth branch pipeline 9, sixth branch pipeline 10, liquid inlet/outlet master valve 11, first branch valve 11-1, second branch valve 11-2, third branch valve 11-3, fourth branch valve 11-4, first pressure gauge 12-1, second pressure gauge 12-2, liquid nitrogen pressurizing device 13, first flow control valve 14-1, second flow control valve 14-2, third flow control valve 14-3, first metal hose 15-1, second metal hose 15-2, first one-way valve 16-1, second one-way valve 16-2, third one-way valve 16-3, fourth one-way valve 16-4, fifth one-way valve 16-5, sixth one-way valve 16-6, first pressure stabilizing valve 17-1, second pressure stabilizing valve 17-2, block valve 18, release valve 19, liquid nitrogen density monitoring system 20-1, foam density monitoring system 20-2, foam liquid plunger pump 21, foam liquid tank 22, and temperature control unit 23.

The liquid nitrogen storage tank 1-1 is connected with the main pipeline 1-2, and the liquid inlet/outlet master valve 11, the temperature control unit 23 and the liquid nitrogen pressurizing device 13 are respectively arranged on the main pipeline 1-2. A liquid nitrogen tank truck is on the ground to fill liquid nitrogen into the liquid nitrogen storage tank 1-1, the liquid nitrogen storage tank 1-1 is filled and transferred under a well, and is connected with the liquid inlet/outlet master valve 11, the temperature control unit 23 and the liquid nitrogen pressurizing device 13 sequentially.

Two branch pipelines are branched from the liquid nitrogen pressurizing device 13, namely the first branch pipeline 5 and the second branch pipeline 6; the first branch pipeline 5 as well as instruments and meters and relevant valves on the first branch pipeline 5 form the liquid nitrogen direct injection system; the tail end of the first branch pipeline 5 is connected to the Characteristic fire zone; and the tail end of the second branch pipeline 6 is connected with the liquid nitrogen inlet of the foam generator.

The first branch valve 11-1, the first thermometer 2-1, the first pressure gauge 12-1 and the first flow control valve 14-1 are sequentially connected with the first branch pipeline 5 of the liquid nitrogen direct injection system; subsequently, the first metal hose 15-1, the first one-way valve 16-1, the first pressure stabilizing valve 17-1, the block valve 18, the release valve 19 and the liquid nitrogen density monitoring system 20-1 are connected; and the liquid nitrogen density monitoring system can be a liquid nitrogen density sensor which is ultimately connected to the Characteristic fire zone.

The low-temperature foaming system includes the second branch pipeline 6, the third branch pipeline 7, the fourth branch pipeline 8, the fifth branch pipeline 9, the sixth branch pipeline 10 as well as relevant valves and instruments and meters mounted on the pipelines. The second branch valve 11-2, the second thermometer 2-2, the second pressure gauge 12-2, the second flow control valve 14-2, the second metal hose 15-2, the second pressure stabilizing valve 17-2 and the second one-way valve 16-2 are sequentially mounted on the second branch pipeline 6; the tail end is connected with the liquid nitrogen inlet 4-1-1 of the foam generator; the third branch valve 11-3 and the third one-way valve 16-3 are mounted on the third branch pipeline 7 from front to back; the clean water tank 3, the fourth branch valve 11-4, the foam liquid tank 22, the foam liquid plunger pump 21, the third flow control valve 14-3 and the fourth one-way valve 16-4 are sequentially connected with the fourth branch pipeline 8; the head end of the fifth branch pipeline 9 is connected with the tail end of the fourth branch pipeline 8; the middle is connected with the tail end of the third branch pipeline 7; the tail end is connected with the foam liquid inlet 4-1-2 of the foam generator 4; the fifth one-way valve 16-5 is mounted on the fifth branch pipeline 9; the head end of the sixth branch pipeline 10 is connected with the foam outlet 4-1-3 of the foam generator 4; the tail end is connected with the Characteristic fire zone; the sixth one-way valve 16-6 and the foam density monitoring system 20-2 are sequentially mounted on the sixth branch pipeline 10; and the foam density monitoring system 20-2 can be a foam density sensor.

Figure 2:
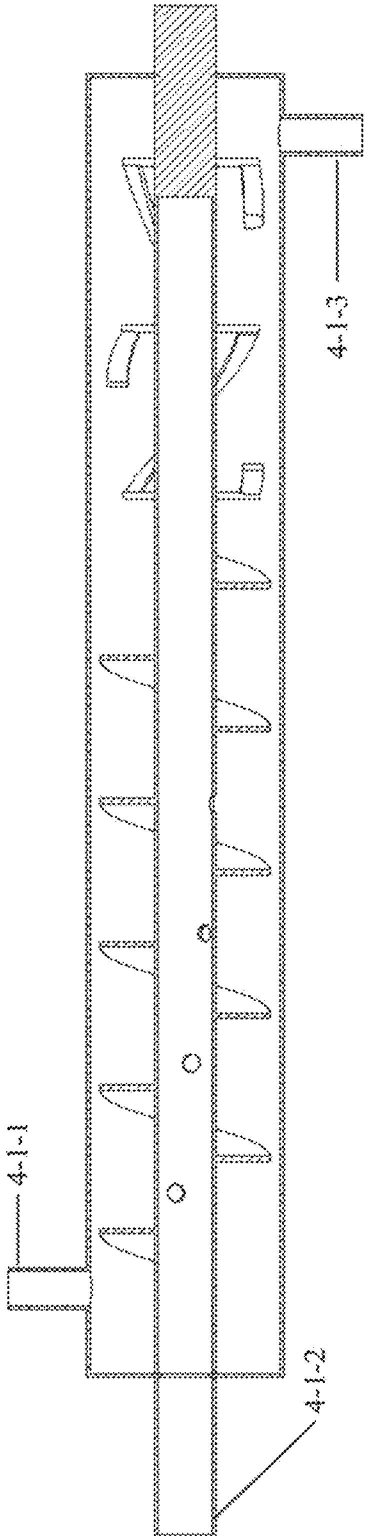
FIG. 2 is a schematic structure diagram of a foam generator.
Figure 3:
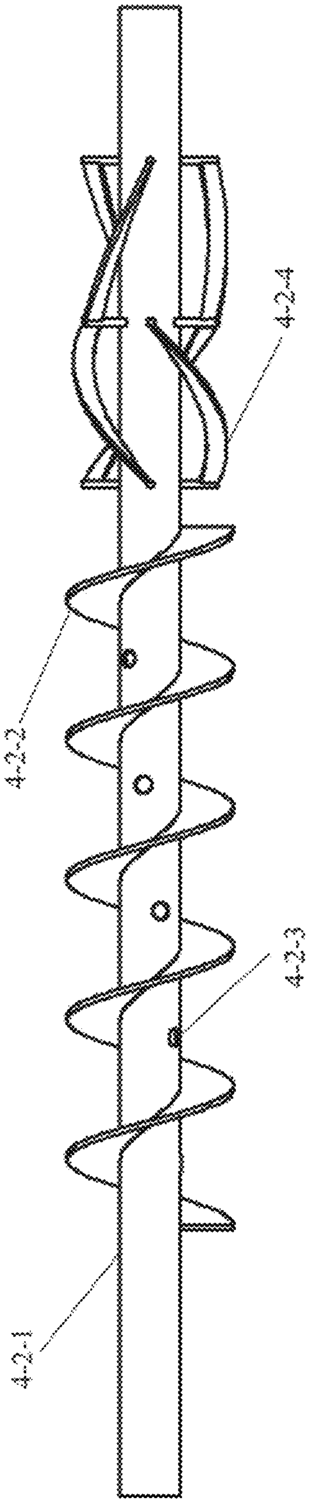
FIG. 3 is a schematic structure diagram of a hollow spiral tube.
Figure 4:
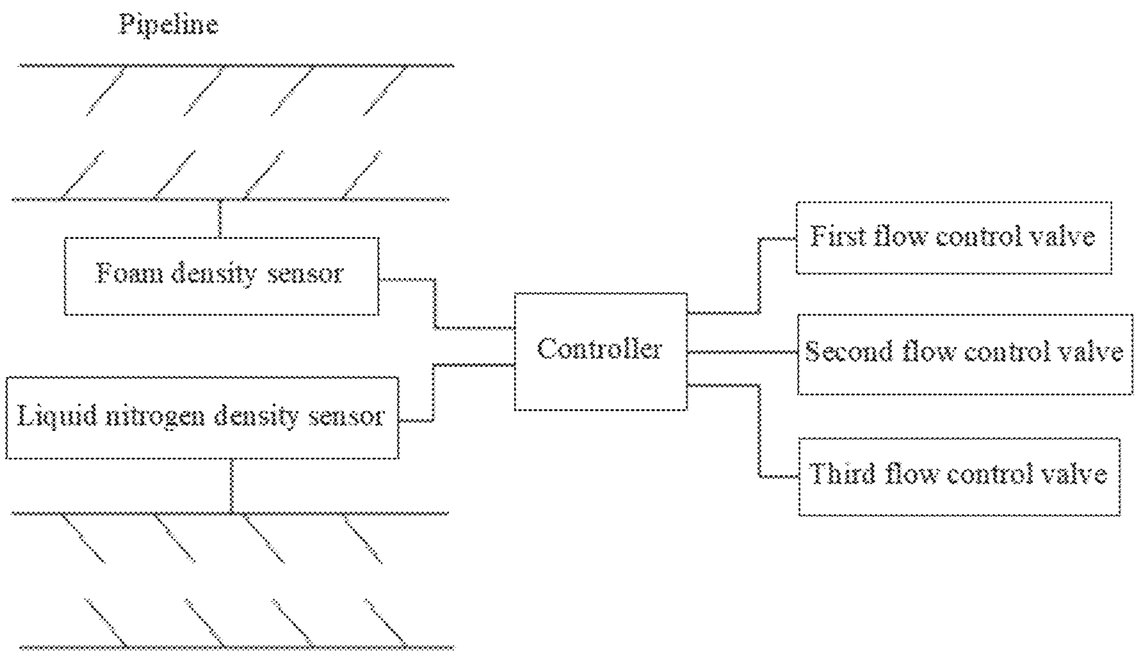
FIG. 4 is a structural block diagram of a control system of the present invention.
Figure 5:
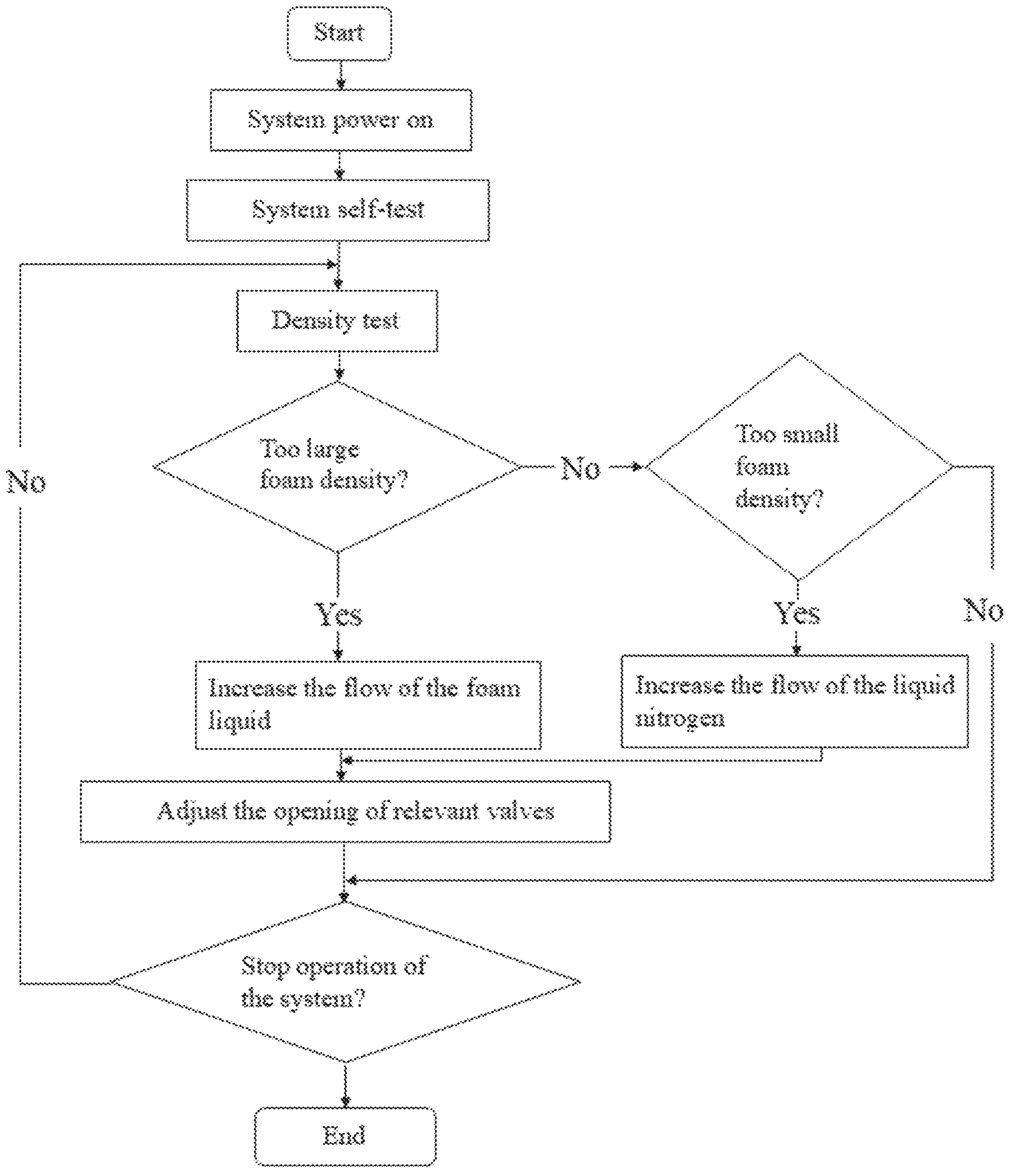
FIG. 5 is a flow chart of a use method of the present invention.

As shown in FIG. 2 and FIG. 3, the foam generator 4 includes a foam generator housing and an inner structure; the liquid nitrogen inlet 4-1-1, the foam liquid inlet 4-1-2 and the foam outlet 4-1-3 are formed in the foam generator housing; and the hollow spiral tube 4-2-1, the helical blades 4-2-2, the foam liquid outlet 4-2-3 and the stirring blades 4-2-4 are arranged inside the foam generator 4.

The helical blades have the pitch of 90-130 mm and the number of turns of 4-5, and are in a clockwise rotation direction; the inner diameter of the hollow spiral tube is 30-40 mm, and the outer diameter is 34-48 mm; and the foam liquid outlet is of a round hole with the diameter of 6-15 mm.

The application method of the system is as follows: specifically including the following steps:

Step I, Liquid Nitrogen Direct Injection System connecting all parts of the system, inspecting the air tightens, opening the block valve 18, closing the second branch valve 11-2, the third branch valve 11-3 and the fourth branch valve 11-4, opening the liquid inlet/outlet master valve 11, adjusting the liquid nitrogen pressurizing device 13, the first flow control valve 14-1, the first pressure stabilizing valve 17-1, and the temperature control unit 23, observing the first thermometer 2-1 and the first pressure gauge 12-1, and keeping the temperature and pressure appropriate. If the density of the liquid nitrogen conforms to the set threshold, directly injecting the liquid nitrogen into the Characteristic fire zone; and if the density of the liquid nitrogen does not conform to the set threshold, injecting into the Characteristic fire zone after the flow of the liquid nitrogen is regulated by the control system.

Step II, Low-Temperature Foaming System connecting all parts of the system, closing the first branch valve 11-1, opening the liquid inlet/outlet master valve 11, the second branch valve 11-2, the third branch valve 11-3 and the fourth branch valve 11-4, adjusting the liquid nitrogen pressurizing device 13, the second flow control valve 14-2, the second pressure stabilizing valve 17-2 and the temperature control unit 23, observing the second thermometer 2-2 and the second pressure gauge 12-2, and keeping the temperature and pressure of the liquid nitrogen appropriate. If the foam density conforms to a system set threshold, filling three-phase foams, the inorganic solidified foams and inhibited foams into the Characteristic fire zone through the foam generator 4; if the foam density does not conform to the system set threshold, after measuring the density through the foam density monitoring system 20-2, injecting into the Characteristic fire zone after the flow of the liquid nitrogen/foams is regulated;

connecting all parts of the system, closing the first branch valve 11-1 and the third branch valve 11-3, opening the liquid inlet/outlet master valve 11, the second branch valve 11-2 and the fourth branch valve 11-4, adjusting the liquid nitrogen pressurizing device 13, the second flow control valve 14-2, the second pressure stabilizing valve 17-2 and the temperature control unit 23, observing the second thermometer 2-2 and the second pressure gauge 12-2, and keeping the temperature and pressure of the liquid nitrogen appropriate. If the density of the liquid nitrogen foams conforms to the system set threshold, directly injecting the liquid nitrogen foams into the Characteristic fire zone through the foam generator 4; and if the density of the liquid nitrogen foams does not conform to the system set threshold, injecting into the Characteristic fire zone after the flow of the liquid nitrogen/foams is regulated by the control system.

In liquid nitrogen direct injection, the liquid nitrogen storage tank 1-1 is filled by the liquid nitrogen tank truck, and the liquid nitrogen storage tank 1-1 is transferred under the well. Sequentially connecting the liquid inlet/outlet master valve 11, the temperature control unit 23 and the liquid nitrogen pressurizing device 13 on the main pipeline 1-2; connecting the first branch valve 11-1, the first thermometer 2-1, the first pressure gauge 12-1, the first flow control valve 14-1, the first metal hose 15-1, the first one-way valve 16-1, the first pressure stabilizing valve 17-1, the block valve 18, the release valve 19 and the liquid nitrogen density monitoring system 20-1 on the first branch pipeline 5; step 1, closing the second branch valve 11-2 on the second branch pipeline 6; and step 2, opening the liquid inlet/outlet master valve 11 to enable the liquid nitrogen to flow out, and adjusting the liquid nitrogen pressurizing device 13, the temperature control unit 23, the first flow control valve 14-1 and the first pressure stabilizing valve 17-1. Setting a threshold for the liquid nitrogen density monitoring system, at the same time observing the first thermometer 2-1 and the first pressure gauge 12-1, and keeping the temperature and pressure appropriate. If the density of the liquid nitrogen conforms to the set threshold, directly injecting the liquid nitrogen into the goaf to cool and inert the goaf; and if the density of the liquid nitrogen does not conform to the set threshold, injecting into the goaf after the first flow control valve 14-1 is adjusted by the control system until the density of the liquid nitrogen conforms to the set threshold. According to actual application situations, the liquid nitrogen storage tanks 1-1 can be alternated, and the temperature, pressure and density of liquid nitrogen at different parts of the system can be regulated according to requirements at the site.

In injection of liquid nitrogen foams, the liquid nitrogen storage tank 1-1 is filled by the liquid nitrogen tank truck, and the liquid nitrogen storage tank 1-1 is transferred under the well. Sequentially connecting the liquid inlet/outlet master valve 11, the temperature control unit 23 and the liquid nitrogen pressurizing device 13 on the main pipeline 1-2. Closing the first branch valve 11-1 on the first branch pipeline 5; sequentially connecting the second branch valve 11-2, the second thermometer 2-2, the second pressure gauge 12-2, the second flow control valve 14-2, the second metal hose 15-2, the second pressure stabilizing valve 17-2 and the second one-way valve 16-2 on the second branch pipeline 6; connecting the tail end of the second branch pipeline 6 with the liquid nitrogen inlet of the foam generator 4; sequentially connecting the clean water tank 3, the fourth branch valve 11-4, the foam liquid tank 22, the foam liquid plunger pump 21, the third flow control valve 14-3 and the fourth one-way valve 16-4 on the fourth branch pipeline 8; connecting the head end of the fifth branch pipeline 9 with the tail end of the fourth branch pipeline; connecting the middle of the fifth branch pipeline 9 with the tail end of the third branch pipeline 7; connecting the tail end of the fifth branch pipeline 9 with the foam liquid inlet 4-1-2 of the foam generator 4; connecting the head end of the sixth branch pipeline 10 with the foam outlet 4-1-3 of the foam generator 4; connecting the tail end of the sixth branch pipeline 10 to the goaf; particularly inerting and cooling the residual coal in the goal; and sequentially mounting the sixth branch valve 16-6 and the foam density monitoring system 20-2 on the sixth branch pipeline 10. Step 1, closing the first branch valve 11-1; opening the liquid inlet/outlet master valve 11 and the second branch valve 11-2 to enable the liquid nitrogen to flow to the second branch pipeline 6; adjusting the liquid nitrogen pressurizing device 13, the temperature control unit 23, the second flow control valve 14-2 and the second pressure stabilizing valve 17-2; at the same time observing the second thermometer 2-2 and the second pressure gauge 12-2 to keep the temperature and pressure of the liquid nitrogen appropriate; step 2, closing the third branch valve 11-3; opening the fourth branch valve 11-4; starting the foam liquid plunger pump 21; and adjusting the third flow control valve 14-3. If the density of the liquid nitrogen foams conforms to the system set threshold, directly injecting the liquid nitrogen foams into the goaf through the foam generator 4; and if the density of the liquid nitrogen foams does not conform to the system set threshold, injecting into the goaf after the second flow control valve 14-2 or the third flow control valve 14-3 is controlled by the system until the density of the liquid nitrogen foams conforms to the system set threshold. According to actual application situations, the liquid nitrogen storage tanks 1-1 can be alternated, and the temperature, pressure and foam density at different parts of the low-temperature foaming system can be regulated according to application at the site.

In injection of three-phase foams, inorganic solidified foams and inhibited foams, the liquid nitrogen storage tank 1-1 is filled by the liquid nitrogen tank truck, and the liquid nitrogen storage tank 1-1 is transferred under the well. Sequentially connecting the liquid inlet/outlet master valve 11, the temperature control unit 23 and the liquid nitrogen pressurizing device 13 on the main pipeline 1-2. Closing the first branch valve 11-1 on the first branch pipeline 5; sequentially connecting the second branch valve 11-2, the second thermometer 2-2, the second pressure gauge 12-2, the second flow control valve 14-2, the second metal hose 15-2, the second pressure stabilizing valve 17-2 and the second one-way valve 16-2 on the second branch pipeline 6; connecting the tail end of the second branch pipeline 6 with the liquid nitrogen inlet of the foam generator 4; sequentially connecting the third branch valve 11-3 and the third one-way valve 16-3 on the third branch pipeline 7; sequentially connecting the clean water tank 3, the fourth branch valve 11-4, the foam liquid tank 22, the foam liquid plunger pump 21, the third flow control valve 14-3 and the fourth one-way valve 16-4 on the fourth branch pipeline 8; connecting the head end of the fifth branch pipeline 9 with the tail end of the fourth branch pipeline; connecting the middle of the fifth branch pipeline 9 with the tail end of the third branch pipeline 7; connecting the tail end of the fifth branch pipeline 9 with the foam liquid inlet 4-1-2 of the foam generator 4; connecting the head end of the sixth branch pipeline 10 with the foam outlet 4-1-3 of the foam generator 4; connecting the tail end of the sixth branch pipeline 10 to the Characteristic fire zone; and sequentially mounting the sixth branch valve 16-6 and the foam density monitoring system 20-2 on the sixth branch pipeline 10. Step 1, closing the first branch valve 11-1; opening the liquid inlet/outlet master valve 11 and the second branch valve 11-2 to enable the liquid nitrogen to flow to the second branch pipeline 6; adjusting the liquid nitrogen pressurizing device 13, the temperature control unit 23, the second flow control valve 14-2 and the second pressure stabilizing valve 17-2; at the same time observing the second thermometer 2-2, the second pressure gauge 12-2 to keep the temperature and pressure of the liquid nitrogen appropriate; step 2, opening the third branch valve 11-3 and the fourth branch valve 11-4; starting the foam liquid plunger pump 21; and adjusting the third flow control valve 14-3. If the density of the inorganic solidified foams conforms to the system set threshold, directly injecting the inorganic solidified foams into a tunnel airtight wall through the foam generator 4; and if the density of the inorganic solidified foams does not conform to the system set threshold, injecting into the airtight wall after the second flow control valve 14-2 or the third flow control valve 14-3 is adjusted by the control system until the density of the inorganic solidified foams conforms to the system set threshold. According to actual application situations, the liquid nitrogen storage tanks 1-1 can be alternated, and the temperature, pressure and density of inorganic solidified foams at different parts of the low-temperature foaming system can be regulated according to application at the site.

Although the embodiments of the present invention have been shown and described, those of ordinary skill in the art can understand that various changes, modifications, replacements, and variations can be made to these embodiments without departing from the principle and spirit of the present invention, and the scope of the present invention is defined by the appended claims and equivalents thereof.

What is claimed is:

1. An application method for a liquid nitrogen direct injection and foaming intelligent filling system based on mine fire area characteristics, wherein:

the liquid nitrogen direct injection and foaming intelligent filling system based on mine fire area characteristics, comprises a liquid nitrogen storage tank, a liquid nitrogen direct injection system and a foaming system, wherein the liquid nitrogen storage tank communicates with a liquid nitrogen pressurizer through a main pipeline; a temperature controller is arranged on the main pipeline; the liquid nitrogen pressurizer is connected with the liquid nitrogen direct injection system and the foaming system, respectively;

the liquid nitrogen direct injection system comprises a first branch pipeline, a first branch valve and a liquid nitrogen density sensor arranged on the first branch pipeline;

the foaming system comprises a second branch pipeline; the second branch pipeline communicates with a liquid nitrogen inlet of a foam generator; a foam liquid inlet of the foam generator communicates with a foam liquid plunger pump through a fifth branch pipeline; the foam liquid plunger pump communicates with a clean water tank through a fourth branch pipeline; a foam liquid tank is arranged on the fourth branch pipeline; a foam outlet of the foam generator communicates with a sixth branch pipeline; a foam density sensor is arranged on the sixth branch pipeline; a third branch pipeline communicates with the fifth branch pipeline; the third branch pipeline also communicates with a slurry or an inhibitor solution pipeline;

the liquid nitrogen pressurizer communicates with the first branch pipeline and the second branch pipeline, respectively;

a first flow control valve is arranged on the first branch pipeline; a second flow control valve is arranged on the second branch pipeline; a third flow control valve is arranged on the fifth branch pipeline;

the liquid nitrogen density sensor and the foam density sensor are respectively connected with a controller; the controller is connected with the first flow control valve, the second flow control valve and the third flow control valve, respectively;

the foam generator comprises a housing and a hollow spiral tube arranged in the housing; a foam liquid outlet, helical blades and stirring blades are arranged on the hollow spiral tube; the liquid nitrogen inlet and the foam outlet of the foam generator are respectively arranged on both sides of the housing; an opening of the hollow spiral tube is the foam liquid inlet; the foam liquid inlet and the liquid nitrogen inlet are formed at an end of the housing; the stirring blades are arranged at another end of the housing;

the first branch valve, a first thermometer, a first pressure gauge, the first flow control valve, a first metal hose, a first one-way valve, a first pressure stabilizing valve, a block valve and a release valve are sequentially arranged on the first branch pipeline in a direction from the liquid nitrogen pressurizer to the liquid nitrogen density sensor;

a second branch valve, a second thermometer, a second pressure gauge, a second flow control valve, a second metal hose, a second pressure stabilizing valve and a second one-way valve are sequentially arranged on the second branch pipeline in a direction from the liquid nitrogen pressurizer to the foam generator;

a third branch valve and a third one-way valve are arranged on the third branch pipeline; a fourth branch valve is arranged between the clean water tank and the foam liquid tank; the third flow control valve, a fourth one-way valve and a fifth one-way valve are sequentially arranged on the fifth branch pipeline in a direction from the foam liquid plunger pump to the foam generator; the third branch pipeline communicates with the fifth branch pipeline between the fourth one-way valve and the fifth one-way valve; and a sixth one-way valve is arranged between the foam density sensor and the foam generator;

wherein, the method comprises the following steps:

a. sequentially connecting the liquid nitrogen direct injection system and the foaming system, and inspecting whether an airtight connection exists;

b. filling liquid nitrogen into a fire area through the liquid nitrogen direct injection system by:

opening the first branch valve, closing the second branch valve, opening a liquid inlet/outlet master valve connected with the liquid nitrogen storage tank, adjusting the liquid nitrogen pressurizer, the temperature controller, the first flow control valve, the second flow control valve, the first pressure stabilizing valve, the second pressure stabilizing valve, observing the first thermometer, the second thermometer, the first pressure gauge and the second pressure gauge, and if a density of the liquid nitrogen conforms to a first set threshold, directly injecting the liquid nitrogen into a mine fire area; if the density of the liquid nitrogen does not conform to the first set threshold, injecting into a characteristic fire zone after regulating a flow of the liquid nitrogen through the first flow control valve, the second flow control valve and the third flow control valve;

c. filling extinguishing material into the mine fire area through the foaming system by:

closing the first branch valve, opening the liquid inlet/outlet master valve connected with the liquid nitrogen storage tank, the second branch valve and the fourth branch valve, adjusting the liquid nitrogen pressurizer, the first flow control valve, the second flow control valve, the first pressure stabilizing valve and the temperature controller, observing the first thermometer, the second thermometer, the first pressure gauge and the second pressure gauge, and if a density of generated liquid nitrogen foams conforms to a second set threshold, directly injecting the liquid nitrogen foams into the mine fire area through the foam generator; if a density of the liquid nitrogen foams does not conform to the second set threshold, injecting into the characteristic fire zone after regulating the first flow control valve, the second flow control valve and the third flow control valve to regulate the flow of the liquid nitrogen foams;

closing the first branch valve, opening the liquid inlet/outlet master valve connected with the liquid nitrogen storage tank, the second branch valve, the third branch valve and the fourth branch valve, adjusting the liquid nitrogen pressurizer, the flow control valve, the pressure stabilizing valve and the temperature controller, observing the first thermometer, the second thermometer, the first pressure gauge and the second pressure gauge, and if a foam density conforms to a third set threshold, directly injecting three-phase foams, inorganic solidified foams and inhibited foams into the mine fire area through the foam generator; if the foam density does not conform to the third set threshold, injecting into the characteristic fire zone after regulating the foam liquid, the flow of the liquid nitrogen, a slurry or an inhibitor solution.

2. The method according to claim 1, wherein, the helical blades have a pitch of 90 mm to 130 mm and a number of turns of 4 to 5 in a clockwise rotation direction; the hollow spiral tube has an inner diameter of 30 mm to 40 mm, and an outer diameter of 34 mm-48 mm; the foam liquid outlet is a round hole with a diameter of 6 mm to 15 mm; and the foam liquid plunger pump has a working pressure of 29 MPa to 36 MPa.

* * * * *